United States Patent
Chen

(10) Patent No.: US 8,248,570 B2
(45) Date of Patent: Aug. 21, 2012

(54) LIQUID CRYSTAL DISPLAY DEVICE

(75) Inventor: Yu-Jen Chen, Tainan County (TW)

(73) Assignee: Chimei Innolux Corporation, Miao-Li County (TW)

( * ) Notice: Subject to any disclaimer, the term of this patent is extended or adjusted under 35 U.S.C. 154(b) by 250 days.

(21) Appl. No.: 11/046,594

(22) Filed: Jan. 28, 2005

(65) Prior Publication Data

US 2005/0190336 A1 Sep. 1, 2005

(30) Foreign Application Priority Data

Jan. 30, 2004 (TW) ................................ 93102126 A

(51) Int. Cl.
*G02F 1/1339* (2006.01)
(52) U.S. Cl. ....................................................... 349/155
(58) Field of Classification Search .................. None
See application file for complete search history.

(56) References Cited

U.S. PATENT DOCUMENTS

| | | | | |
|---|---|---|---|---|
| 5,499,128 A * | 3/1996 | Hasegawa et al. | ............ | 349/155 |
| 5,739,882 A * | 4/1998 | Shimizu et al. | ............ | 349/123 |
| 6,115,098 A * | 9/2000 | Kume et al. | ............ | 349/156 |
| 6,147,729 A * | 11/2000 | Kurauchi et al. | ............ | 349/106 |
| 6,362,865 B2 * | 3/2002 | Yoshida | ........................ | 349/138 |
| 6,424,402 B1 * | 7/2002 | Kishimoto | .................... | 349/156 |
| 6,466,295 B1 | 10/2002 | Hsieh | | |
| 6,570,639 B1 * | 5/2003 | Manabe et al. | ................ | 349/190 |
| 6,624,860 B1 * | 9/2003 | Narutaki et al. | ............. | 349/106 |
| 6,683,670 B2 | 1/2004 | Chung et al. | | |
| 6,811,458 B2 * | 11/2004 | Kouya | ............................. | 445/24 |
| 6,900,869 B1 * | 5/2005 | Lee et al. | ....................... | 349/129 |
| 7,133,108 B2 | 11/2006 | Shimizu et al. | | |
| 7,456,926 B2 | 11/2008 | Shimizu et al. | | |
| 2001/0026347 A1 * | 10/2001 | Sawasaki et al. | ............. | 349/156 |
| 2002/0145689 A1 * | 10/2002 | Kaneko | .......................... | 349/114 |
| 2005/0099577 A1 * | 5/2005 | Lee et al. | ....................... | 349/155 |

FOREIGN PATENT DOCUMENTS

| | | | |
|---|---|---|---|
| JP | 03288828 A | * | 12/1991 |
| JP | 2002-023170 | | 1/2002 |
| JP | 2002-229040 | | 8/2002 |
| KR | 10-1999-0080466 | | 11/1999 |
| KR | 10-2002-0039453 | | 5/2002 |
| KR | 10-2002-0046172 | | 6/2002 |

OTHER PUBLICATIONS

Attached machine translated abstract of Nishiki Tamahiko et al (JP 03-288828).*
Attached Machine translated abstract of Nishiki Tamahiko et al (JP 03-288828) Dec. 19, 1991.*
Korean language office action dated May 11, 2011.
English language translation of Korean language office action, May 11, 2011.

(Continued)

*Primary Examiner* — Lucy Chien
(74) *Attorney, Agent, or Firm* — Thomas|Kayden

(57) ABSTRACT

One embodiment, among others, of a liquid crystal display device includes a first substrate, a second substrate, a liquid crystal material and a plurality of spacers. The first substrate and the second substrate are joined with each other to form a cavity for receiving the liquid crystal material. The spacers are disposed between the first substrate and the second substrate, and have a two-stage elastic constant.

7 Claims, 15 Drawing Sheets

OTHER PUBLICATIONS

English language translation of abstract of KR 10-1999-0080466 (published Nov. 5, 1999).

English language translation of abstract of JP 2002-023170 (published Jan. 23, 2002).

English language translation of abstract of KR 10-2002-0039453 (published May 27, 2002).

English language translation of abstract KR 10-2002-0046172 (published Jun. 20, 2002).

* cited by examiner

LIQUID CRYSTAL DISPLAY DEVICE

This application claims the priority benefit of Taiwan Patent Application Serial Number 093102126, filed Jan. 30, 2004, the full disclosure of which is incorporated herein by reference.

BACKGROUND

1. Technical Field

The present disclosure generally relates to a liquid crystal display device, and more particularly to a liquid crystal display device including a spacer that has at least two surfaces with different horizontal plane, thereby resulting in a two-stage deformation.

2. Description of the Related Art

A liquid crystal display (LCD) device typically includes a pair of substrates that are maintained in a space apart, yet parallel relationship with each other. The space between the substrates is commonly referred to as the cell gap. Interposed between the substrates, within the cell gap, is a liquid crystal material that changes its optical characteristics in response to an applied electrical signal.

In order to assure the proper operation of a liquid crystal display device, it is critical that the cell gap is maintained uniformly and precisely throughout the entire display. For example, even slight deviations in the cell gap will result in a noticeable and defective appearance in the display (so-called chrominance non-uniformity or Mura defect). This can readily be seen in a conventional LCD display panel with a fingertip pressure on the surface. In response to the pressure, the cell gap in the affected area will be reduced slightly, resulting in a dark spot, degradation of contrast or other undesirable defects in the displayed image.

In a conventional technology, the LCD device includes a thin film transistor (TFT) substrate 61, a color filter substrate 71 and a liquid crystal material 69 sandwiched therebetween, shown in FIG. 1. The cell gap is maintained by providing a plurality of spacers 79 between the two substrates 61, 71. The spacers 79 which are of a uniform height are disposed randomly within the cell gap by generally utilizing a spraying technique. This generally causes the non-uniform distribution of the spacers partial density. To ensure that an adequate density of spacers to maintain the proper cell gap is disposed in all areas of the display, a superfluity of spacers must be used. In addition, according to such conventional techniques for placement of the spacers, they are placed in both "inactive" and "active" areas of the display. The "active" areas are those areas where the liquid crystal material may be selectively activated because they are located between two opposite electrodes on the substrates. The "inactive" areas are those areas where the liquid crystal material cannot be selectively activated because of the absence of the opposite electrodes on the substrates.

U.S. Pat. No. 4,653,864, entitled "Liquid Crystal Matrix Display Having Improved Spacers And Method Of Make Same," discloses a liquid crystal display 2 incorporated herein by reference, shown in FIG. 2. The liquid crystal display 2 includes a first substrate 10; a plurality of first pixel electrodes 12 disposed on the first substrate 10; a plurality of isolation devices 14 and address lines 16 disposed on the first substrate 10; a second substrate 20; a plurality of second pixel electrodes 13 disposed on the second substrate 20; light influencing display material 15 between the first and second substrates 10, 20; and spacer means 8 for spacing the first and second substrates 10, 20 apart, wherein the spacer means 8 is disposed on the second substrate 20 and includes a plurality of discrete bodies 8a, 8b arranged in a predetermined pattern.

U.S. Pat. No. 6,108,068, entitled "Liquid Crystal Display Apparatus Using Spacers Having Double Structure," discloses a liquid crystal display 30 incorporated herein by reference, shown in FIG. 3. The liquid crystal display 30 includes a liquid crystal layer 32 sandwiched by a front glass substrate 40 and a back glass substrate 50, wherein the liquid crystal layer 32 is provided with a plurality of spacers 38 to maintain a predetermined thickness of the liquid crystal layer. The spacer 38 has a double structure consisting of an elastic external portion 36 and a kernel portion 34. The kernel portion 34 is made of a material that is higher than that of the elastic external portion 36 in hardness. Also, the external hull portion 36 of the spacer 38 is electrically conductive. However; the liquid crystal display 30 is merely considered enabling to reduce flicker and baking generated by electric charge caused by impurities ions remaining on the boundary surface of the liquid crystal layer.

Recently, a technology for rapidly filling the liquid crystal, i.e. a One Drop Fill (ODF) technology of the liquid crystal, is developed. In this technology, one of two substrates is accommodated with the injected liquid crystal material by dropping, before the two substrates will be joined with each other. The filling method of the liquid crystal is disclosed in U.S. Pat. No. 5,263,888, entitled "Method of Manufacture of Liquid Crystal Display Panel," issued to Teruhisa Ishihara et al. on Nov. 23, 1993.

According to a manufacturing process of the One Drop Fill (ODF) technology of the liquid crystal, the operation window (or process window) of the quantity of the injected liquid crystal on the substrate depends on the elasticity of the spacer. When the number of the spacers is too few or the plastic deformation of the spacers is too large (e.g. elastic constant is too low), it can be observed that the relative quantity of the liquid crystal is too much so as to result in the gravity mura. When the number of the spacers is too many or the plastic deformation of the spacers is too small (e.g. elastic constant is too high), it can be observed that the relative quantity of the liquid crystal is too little so as to result in air bubbles. In the mode of an ideal elastomer, the spacer with higher height can acquire the larger operation window.

The prior art has been developed for enlarging the operation window of the quantity of the liquid crystal in the manufacturing process of the ODF technology. For example, as shown in FIG. 4, a liquid crystal display device 80 includes a first substrate 90, a second substrate 98 and a plurality of first and second spacers 92, 94. The first and second spacers 92, 94 are substantially of the same height. The first spacers 92 are disposed on the first substrate 90 and contact the elements, such as thin film transistors, which are protrudently located on the second substrate 98. The second spacers 94 are disposed on the first substrate 90 and do not contact the second substrate 98, i.e. there is a gap to be formed between the second spacers 94 and the second substrate 98. According to the above-mentioned arrangement of the spacers, when the first and second substrates 90, 98 are pressed, the first spacers 92 are firstly compressed. Then, when the second substrate 98 further contacts the second spacers 94, the first and second spacers 92, 94 are simultaneously compressed. Thus, the first and second spacers 92, 94 cooperate to form a process with two-stage elastic deformation, thereby enlarging the operation window of the quantity of the liquid crystal in the manufacturing process of the ODF technology. However, such hybrid spacers of the liquid crystal display device have a relatively complex structure.

Accordingly, there exists a need for a liquid crystal display device including a spacer that has a two-stage deformed process for enlarging the operation window of the quantity of the liquid crystal and also has simple structure.

SUMMARY

It is one object, among others, of the present disclosure to provide a liquid crystal display device including a spacer, which not only has a two-stage deformed process for enlarging the operation window of the quantity of the liquid crystal but also has simple structure.

The present disclosure provides a liquid crystal display device including a first substrate, a second substrate, a liquid crystal material and a plurality of spacers. The first substrate and the second substrate are joined with each other to form a cavity for receiving the liquid crystal material. The spacers are disposed between the first substrate and the second substrate and have a two-stage elastic constant.

A liquid crystal display device according to an embodiment of the present disclosure includes a first substrate, a second substrate, a liquid crystal material and a plurality of spacers. The second substrate is joined with the first substrate for forming a cavity. The liquid crystal material is disposed in the cavity. The spacer has a body, an upper surface and a lower surface, wherein the lower surface is disposed on one of the first and second substrates and the upper surface has a lump contacting the other one of the first and second substrates.

A liquid crystal display device according to another embodiment of the present disclosure includes a first substrate, a second substrate, a liquid crystal material and a plurality of spacers. The second substrate is joined with the first substrate for forming a cavity. The liquid crystal material is disposed in the cavity. The spacer has a body, an upper surface and a lower surface, wherein the lower surface is disposed on one of the first and second substrates, the upper surface contacts the other one of the first and second substrates and the spacer further has a depression disposed on the lower surface.

A liquid crystal display device according to a further embodiment of the present disclosure includes a first substrate, a second substrate, a liquid crystal material and a plurality of spacers. The second substrate is joined with the first substrate for forming a cavity. The liquid crystal material is disposed in the cavity. The spacer has an upper surface and a lower surface, wherein the lower surface is disposed on one of the first and second substrates, the other one of the first and second substrates has a plurality of protrudent patterns contacting the upper surface of the spacer, and the area of the upper surface of the spacer is substantially larger than the area of contacting surface between the spacer and the protrudent patterns.

According to the liquid crystal display device of the present disclosure, when the liquid crystal display device is pressed by an external pressure or a load, the portion located under a first surface of the first spacer is firstly deformed, i.e. a first-stage deformation. Then, when a second surface of the spacer contacts the second substrate, the whole spacer is completely deformed, i.e. a second-stage deformation. Thus, the spacer has a two-stage elastic constant, thereby enlarging the operation window of the quantity of the liquid crystal in the manufacturing process of the ODF technology.

The foregoing, as well as additional objects, features and advantages of the embodiments of the present disclosure will be more readily apparent from the following detailed description, which proceeds with reference to the accompanying drawings.

DETAILED DESCRIPTION

Figure 1:
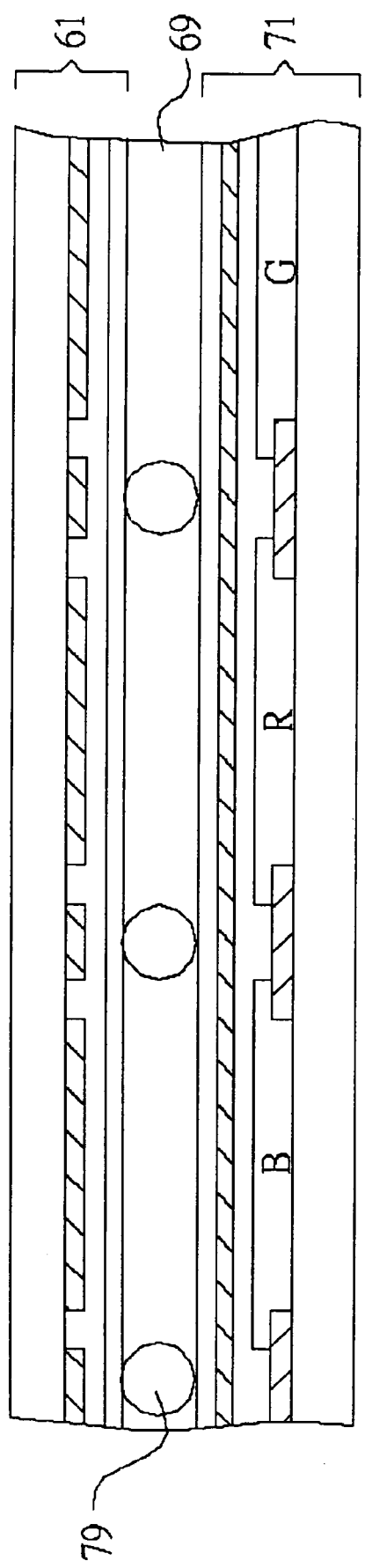
FIG. 1 is a cross-sectional schematic view of a liquid crystal display device with ball spacers in the prior art.
Figure 2:
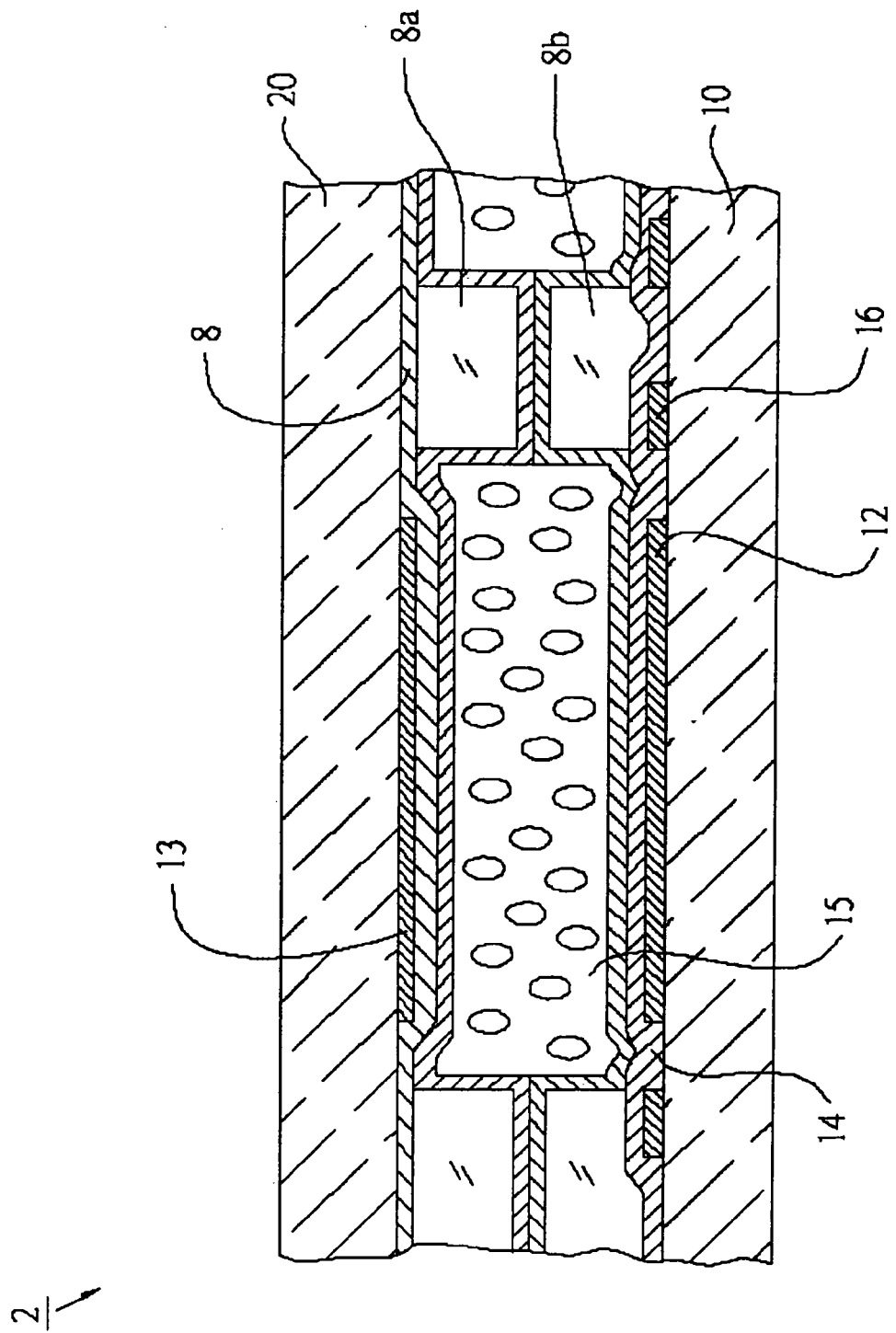
FIG. 2 is a cross-sectional schematic view of a liquid crystal display device with spacers having a plurality of discrete bodies in the prior art.
Figure 3:
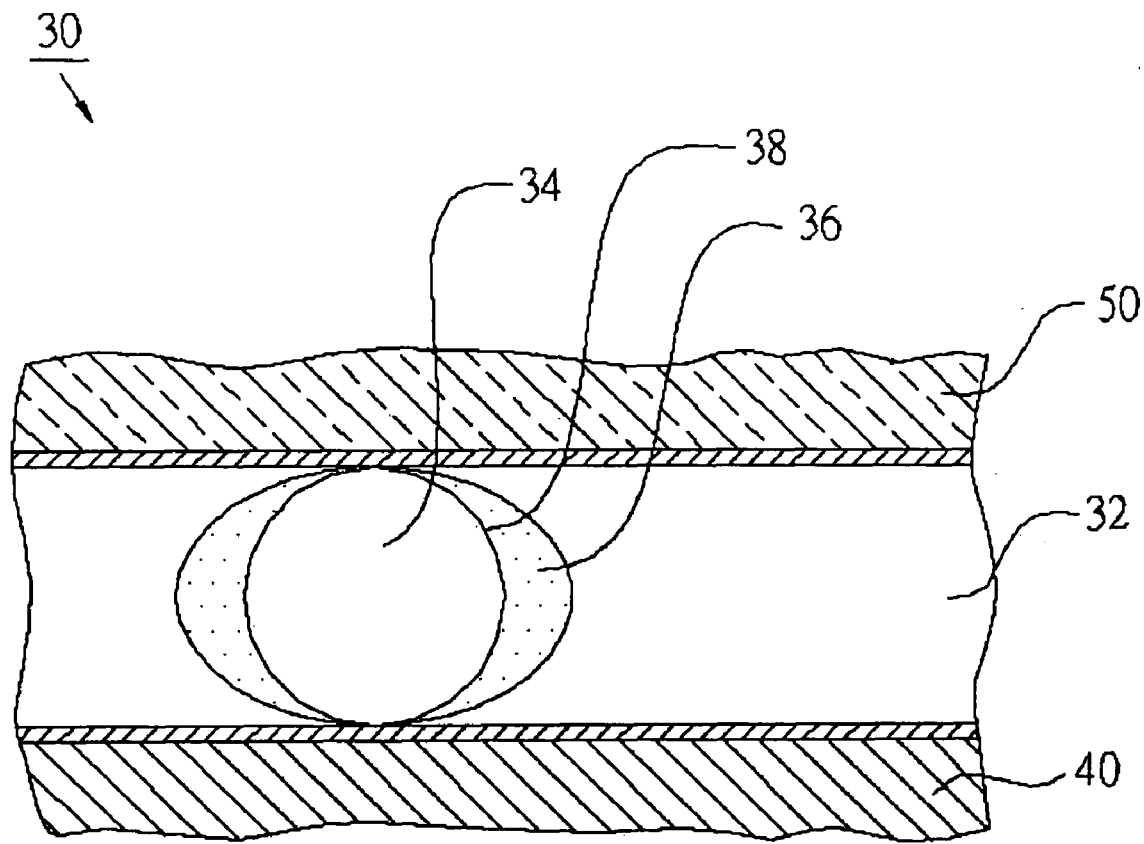
FIG. 3 is a cross-sectional schematic view of a liquid crystal display device with spacers having double structure in the prior art.
Figure 4:
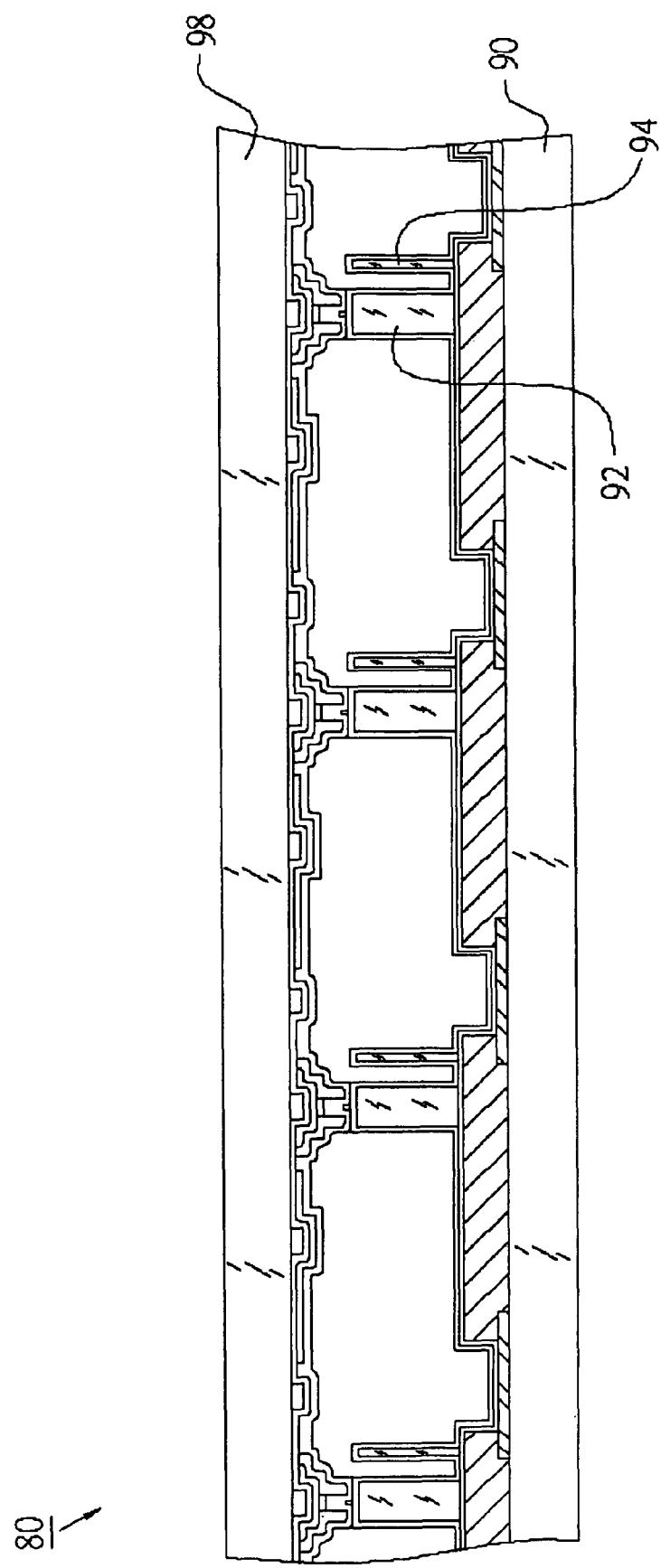
FIG. 4 is a cross-sectional schematic view of a liquid crystal display device with spacers having different stage deformation in the prior art.
Figure 5:
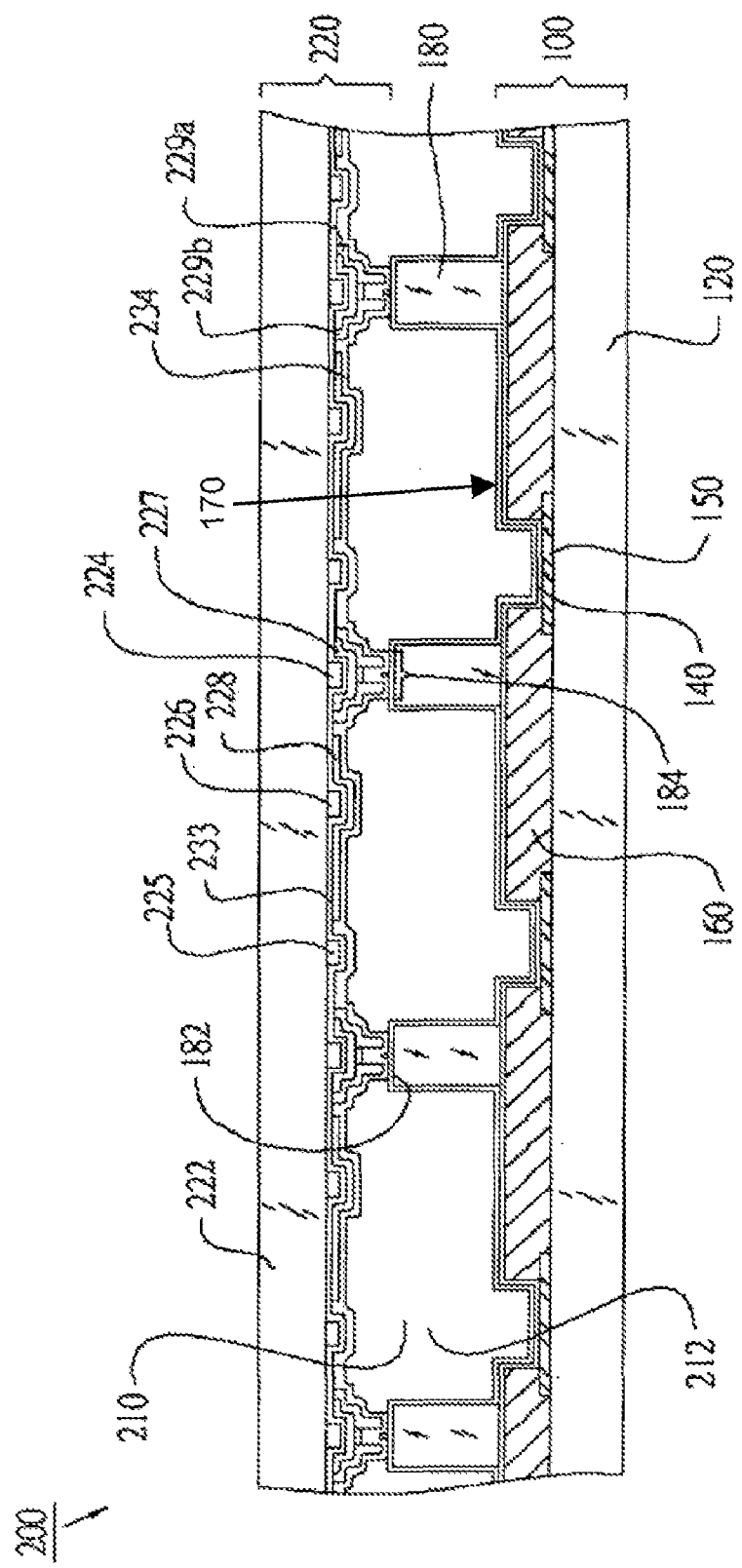
FIG. 5 is a cross-sectional schematic view of a liquid crystal display device according to an embodiment of the present disclosure.

FIG. 5 depicts a liquid crystal display device 200 according to one embodiment, among others, of the present disclosure. The liquid crystal display device 200 includes a first substrate (such as a color filter substrate 100), a second substrate (such as a thin film transistor substrate 220) and a plurality of spacers 180 for spacing the color filter substrate 100 and the thin film transistor substrate 220 apart and defining a uniform and precise gap (i.e. a cell gap). The edges of the color filter substrate 100 and the thin film transistor substrate 220 adhere to each other for defining a cavity 212, which is accommodated with a liquid crystal material 210.

The thin film transistor substrate 220 includes a transparent substrate (such as a glass substrate 222), gate electrodes 224, gate lines (or scan lines) 225 and storage capacitance lines 226, which are respectively formed on the glass substrate 222. The gates 224, the gate lines 225 and the storage capacitance lines 226 are covered with an insulating film 233. A semiconductor layer 227 serving as channel of TFT (Thin Film Transistor) is formed on each gate 224 through the insulating film 233. Furtherover, metal layers 229a, 229b serving as source and drain regions of the TFT are formed on the upper portion of each semiconductor layer 227 and connected to source lines and pixel electrodes 228. Also, the pixel electrode 228, which is constituted by, e.g., Indium Tin Oxide (ITO), covers each storage capacitance line 226, and the insulating film 233 is disposed therebetween. In addition, an alignment film 234 is formed on the source and drain regions 229a, 229b and the pixel electrode 228.

The color filter substrate 100 includes a transparent substrate, such as a glass substrate 120. A black matrix 150 is generally made of metal such as chromium (Cr) or chromium oxide (CrOx) in the form of a thin film or black resin, is applied on the glass substrate 120, and exposes out a part of the glass substrate 120 to define a plurality of pixel areas. The black matrix 150 generally corresponds to the inactive portion of the LCD device 200. The pixel area corresponds to the active portion of the LCD device 200. The color filters 160, consisting of red, green and blue color filters, are in the shape of stripe and disposed, in a stagger manner, on the pixel area. A common electrode 140, which is made of Indium Tin Oxide (ITO), for example, covers the black matrix 150 and the color filters 160.

The spacers 180, which can be of cylindrical, conical or rectangular shape, are formed on the common electrode 140. In other words, the spacers 180 are disposed on the glass substrate 120, and the common electrode 140 is disposed between the spacers 180 and the glass substrate 120. The spacer 180 has a surface 182 with an area that is substantially more than the area of contacting surface 184 between the thin film transistor substrate 220 and the spacer 180.

According to the embodiment in FIG. 5, the location of the spacer 180 is corresponding to the thin film transistor of the thin film transistor substrate 220. In other words, the surface 182 of the spacer 180 is substantially larger than an upper surface of the thin film transistor. It is apparent to one of ordinary skill in the art that the location of the spacer 180 corresponds to any pattern which is protrudently located on the thin film transistor substrate 220, e.g. single layer or multi-layer of the gate lines (or scan lines) 225, where the storage capacitance lines 226 or the metal layers 229a, 229b can be stacked to form the protrudent pattern.

Figure 6:
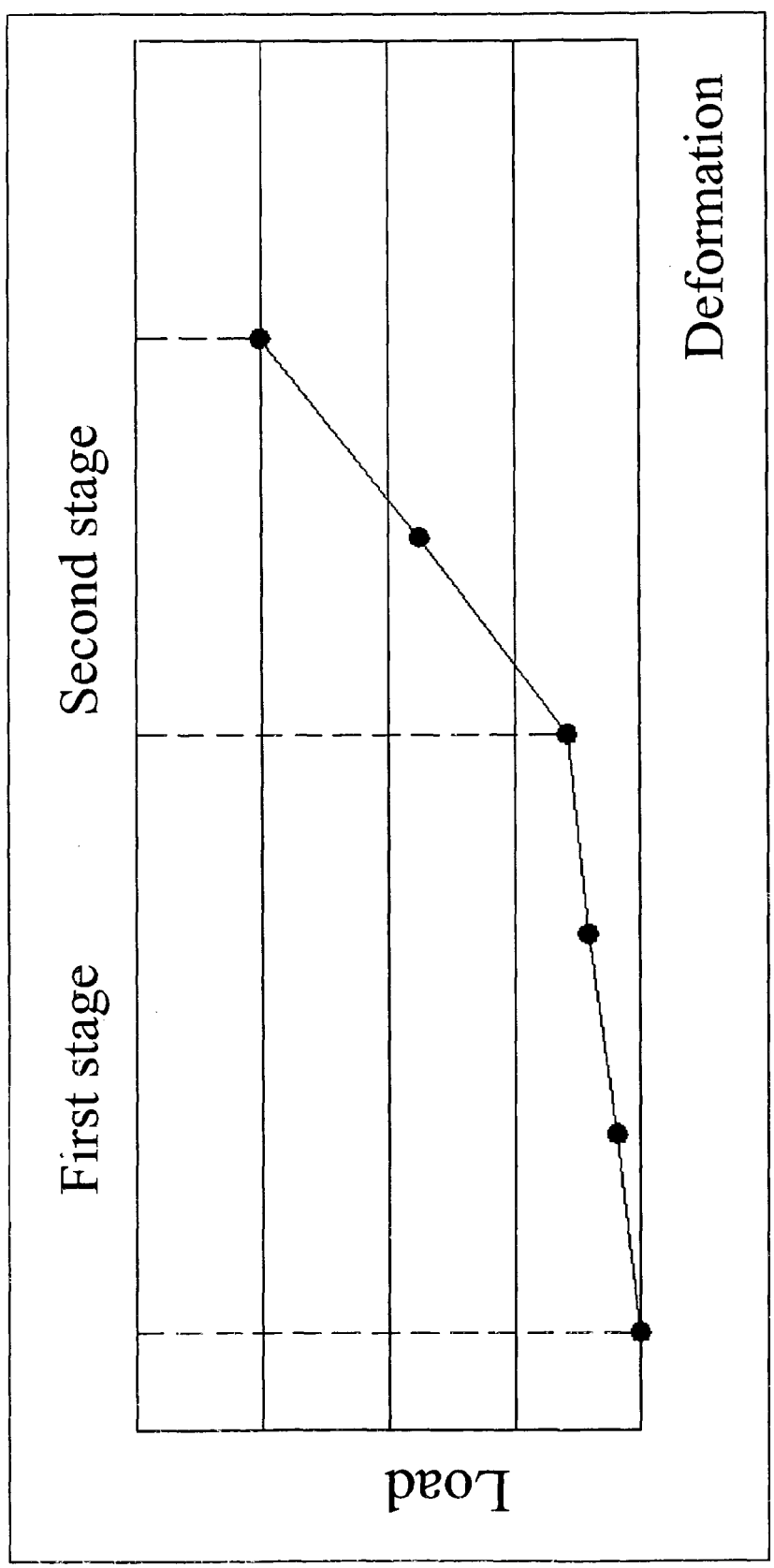
FIG. 6 is a diagram showing the relation between a load and deformation of a liquid crystal display device according to the present disclosure.

According to the above-mentioned arrangement of the spacers 180, when the liquid crystal display device is pressed by an external pressure or a load, the portion located under the contacting surface of the first spacers 180 is firstly deformed, i.e. a first-stage deformation. Then, when the whole upper surface (182) of the spacer 180 contacts the thin film transistor substrate 220, the whole spacer 180 is completely deformed, i.e. a second-stage deformation. Next, FIG. 6 depicts the relation between the load of the spacer and deformation, wherein the vertical coordinate is the load and the horizontal coordinate is the deformation. Thus, the spacer has a two-stage elastic constant, thereby enlarging the operation window of the quantity of the liquid crystal in the manufacturing process of the ODF technology. The spacer 180 with the two-stage elastic constant can be made of single material or different materials.

It is apparent to one of ordinary skill in the art that teachings of the present disclosure also can be applied to different types of liquid crystal displays, such as In Plane Switching (IPS) liquid crystal display, wherein the color filter substrate 100 is not provided with the common electrode 140, and the spacer is directly disposed on a flat layer, a black matrix layer or a color filter. Otherwise, embodiments of the present disclosure can be applied to the thin film transistor substrate including color filters.

An alignment film 170 is further formed on the glass substrate 120. The spacers of the present disclosure are not only individually used but also cooperate with conventional ball spacers or adhesive spacers.

Figure 7:
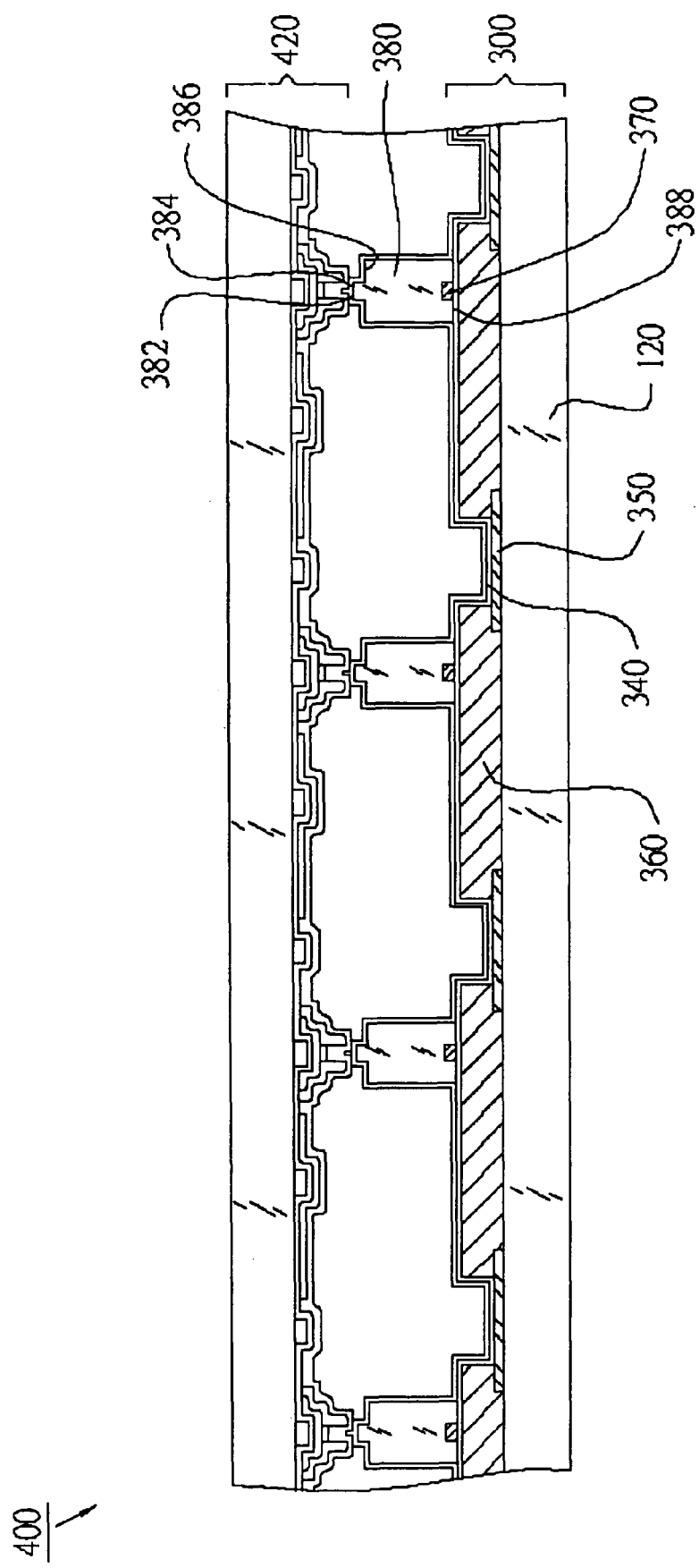
FIG. 7 is a cross-sectional schematic view of a liquid crystal display device according to another embodiment of the present disclosure.
Figure 8:
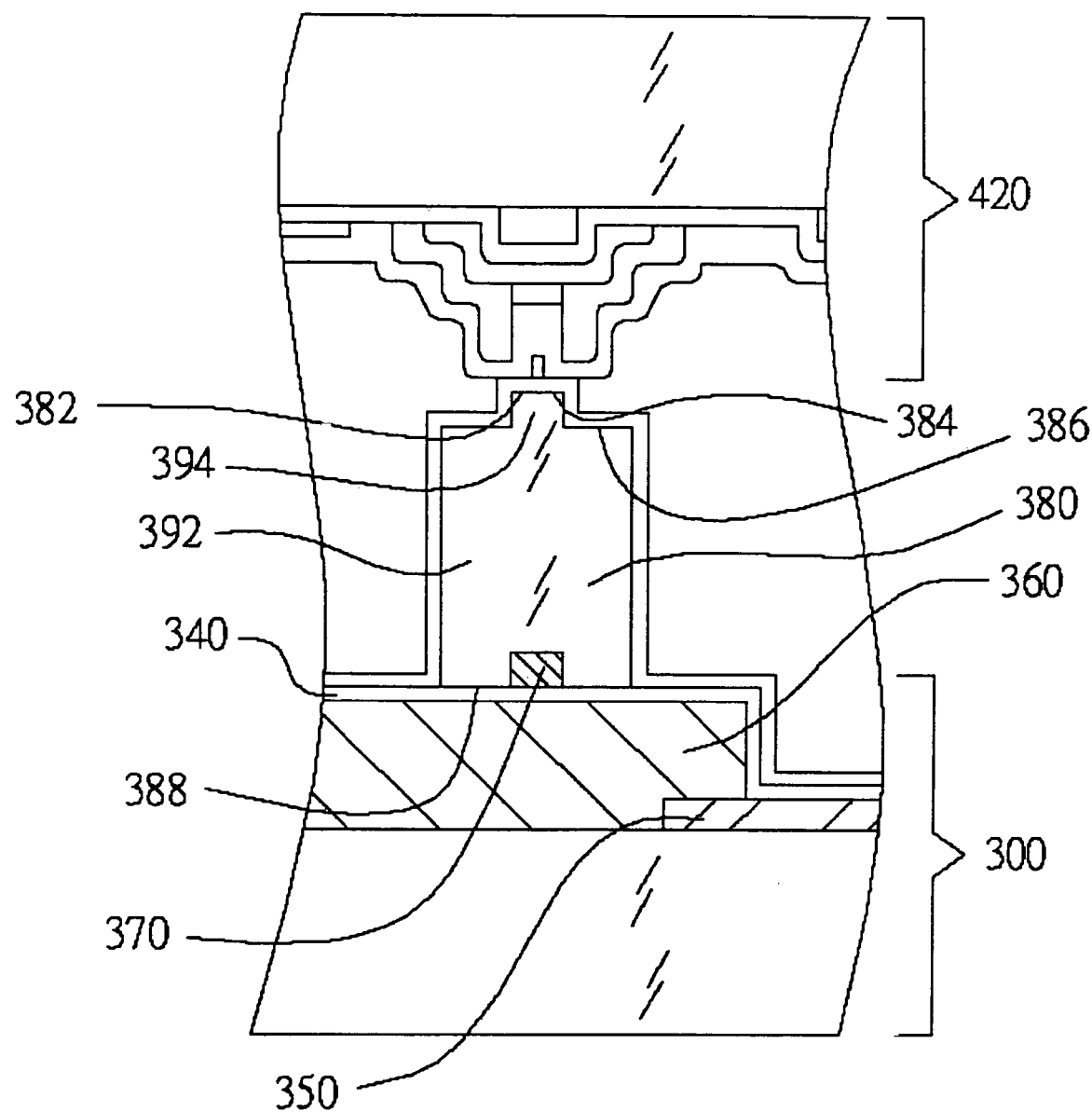
FIG. 8 is a cross-sectional schematic view of a spacer according to an embodiment of the present disclosure.

Referring to FIGS. 7 and 8, they depict a liquid crystal display device 400 according to another embodiment of the present disclosure. The liquid crystal display device 400 is similar to the liquid crystal display device 200 wherein the similar elements are designated with the similar reference numerals (For each element, please refer to the table of reference numerals).

TABLE I (table of reference numerals)

| | | | |
|---|---|---|---|
| 2 | liquid crystal display | 8 | spacer means |
| 8a | discrete bodies | 8b | discrete bodies |
| 10 | first substrate | 12 | first pixel electrodes |
| 13 | second pixel electrode | 14 | isolation device |
| 15 | light influencing display material | | |
| 30 | liquid crystal | | |
| 32 | liquid crystal layer | 34 | kernel portion |
| 36 | elastic external portion | 38 | spacer |
| 40 | front glass substrate | 50 | back glass substrate |
| 16 | address line | 20 | second substrate |
| 61 | thin film transistor (TFT) substrate | 69 | liquid crystal material |
| 71 | color filter substrate | 79 | spacer |
| 80 | liquid crystal display device | 90 | first substrate |
| 92 | first spacer | 94 | second spacer |
| 98 | second substrate | | |
| 100 | color filter substrate | 120 | glass substrate |
| 140 | common electrode | 150 | black matrix |
| 160 | color filter | 170 | alignment film |
| 180 | spacer | 182 | surface |
| 184 | contacting surface | 200 | liquid crystal display device |
| 210 | liquid crystal material | 212 | cavity |
| 220 | thin film transistor substrate | 222 | glass substrate |
| 224 | gate electrode | 225 | gate lines (or scan lines) |
| 226 | storage capacitance line | 227 | semiconductor layer |
| 228 | pixel electrode | 229a | metal layer of source region of the TFT |
| 229b | metal layer of drain region of | 233 | insulating film |

TABLE I-continued (table of reference numerals)

| | | | |
|---|---|---|---|
| 234 | the TFT alignment film | | |
| 300 | color filter substrate | 340 | common electrode |
| 350 | black matrix | | |
| 360 | color filter | 370 | pad layer |
| 380 | spacer | 382 | upper surface |
| 384 | first surfaces | 386 | second surfaces |
| 388 | lower surface | | |
| 392 | body | 394 | lump |
| 394' | lump | 396 | depression |
| 396' | Gap | | |
| 400 | liquid crystal display device | 420 | thin film transistor substrate |

Figure 9:
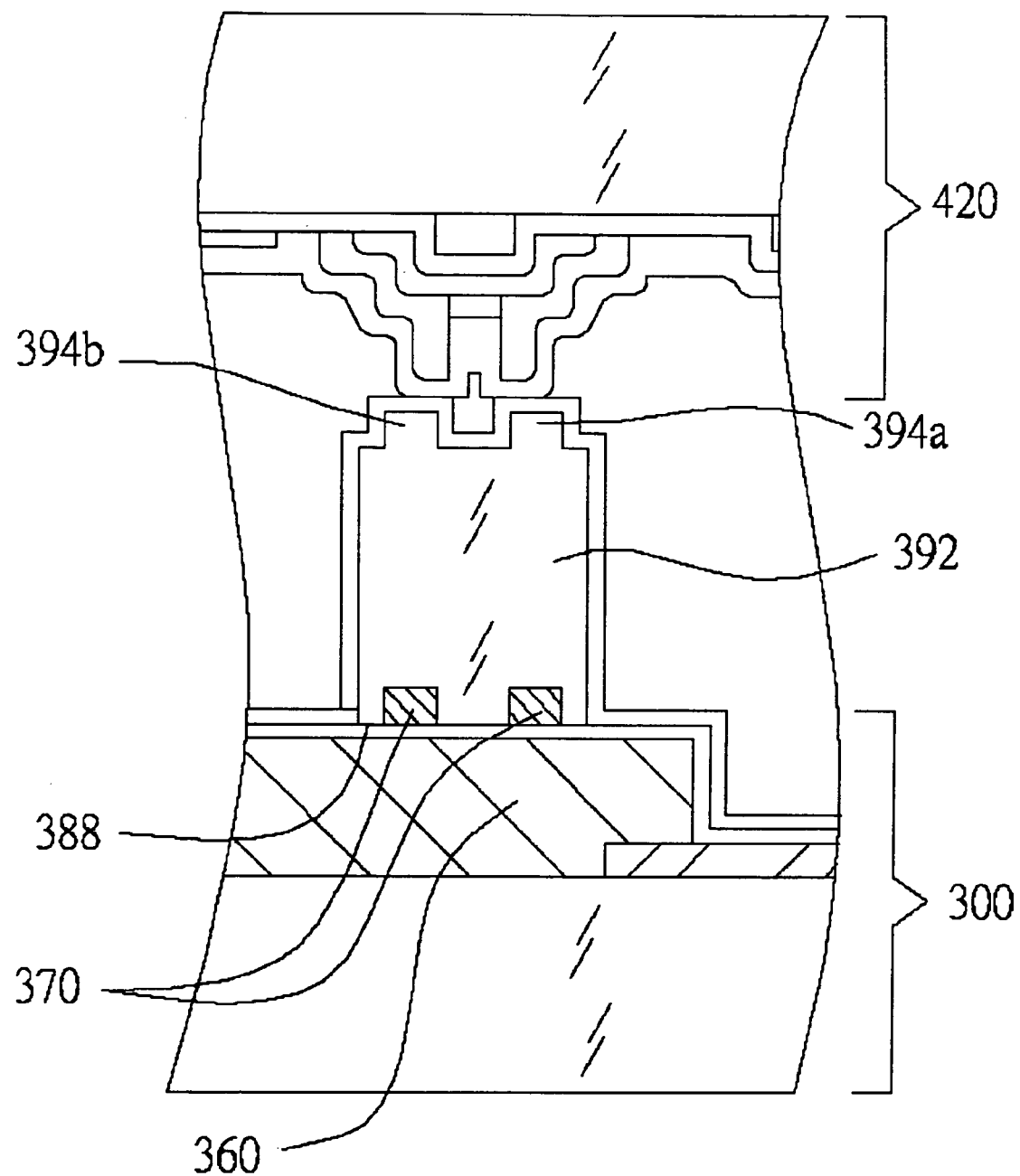
FIG. 9 is a cross-sectional schematic view of a spacer according to another embodiment of the present disclosure.

A plurality of spacers 380, which can be of cylindrical, conical or rectangular shape, are formed on a common electrode 340 of a color filter substrate 300. The spacers 380 has an upper surface 382 and a lower surface 388, and the upper surface 382 has at least two surfaces with different horizontal planes, i.e. first and second surfaces 384, 386. In other words, the upper surface 382 of the spacer 380 can be in the shape of step, for example. The first surfaces 384 contacts a thin film transistor substrate 420, but there is a distance between the second surfaces 386 and the thin film transistor substrate 420. The spacer 380 further has a body 392 and at least one lump 394 disposed on the body 392. The first and second surfaces 384, 386 of the upper surface 382 of the spacers 380 is respectively located on the lump 394 and the body 392. It is apparent to one of ordinary skill in the art that the spacer 380 can have a plurality of lumps 394a, 394b disposed on the body 392 in parallel, shown in FIG. 9.

Referring back to FIGS. 8 and 9, at least one pad layer 370 is disposed under the lower surface 388 of the spacer 380. The pad layer 370 is formed by using photolithography and etching processes. A photo-resist is coated on the pad layer 370, and then the photo-resist becomes the body 392 and the lump 394, 394a, 394b by another photolithography and etching processes. The pad layer 370 can be a color filter 360 of the liquid crystal display device 400 or a part of protrudent pattern of a Multi-domain Vertical Alignment (MVA) liquid crystal display device and simultaneously formed during the manufacturing process for saving the manufacturing time.

Figure 10:
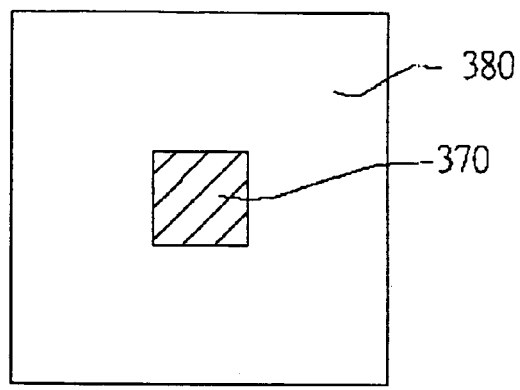
FIG. 10 is a plane schematic view of a lower surface of a spacer according to an embodiment of the present disclosure.
Figure 11:
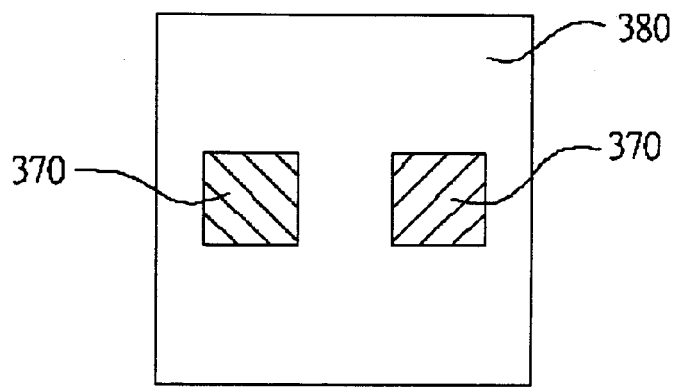
FIG. 11 is a plane schematic view of a lower surface of a spacer according to another embodiment of the present disclosure.
Figure 12:
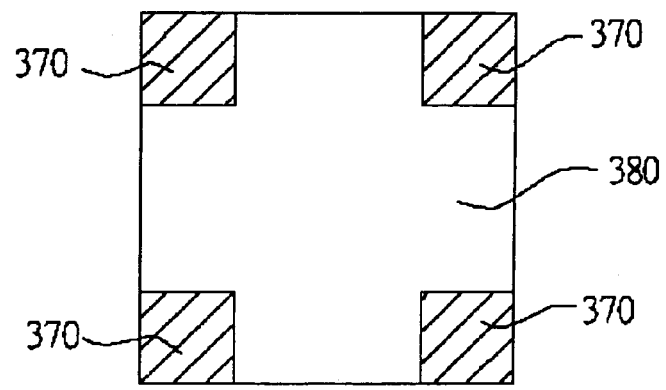
FIG. 12 is a plane schematic view of a lower surface of a spacer according to a further embodiment of the present disclosure.
Figure 13:
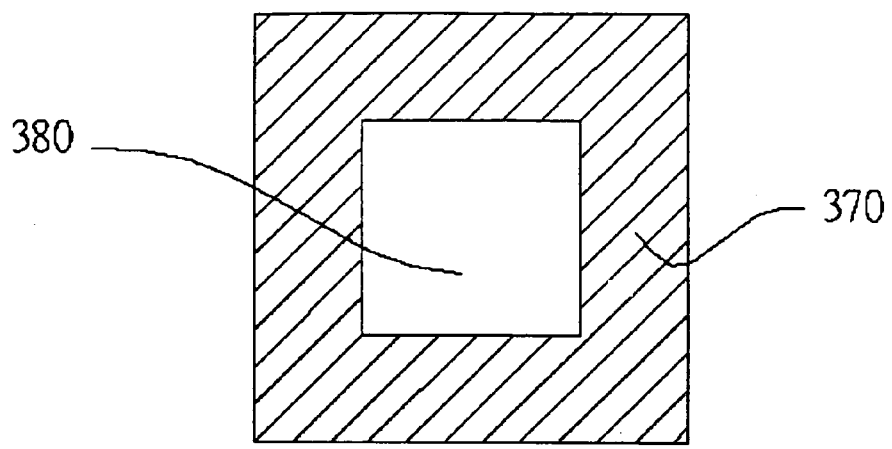
FIG. 13 is a plane schematic view of a lower surface of a spacer according to a still further embodiment of the present disclosure.
Figure 14:
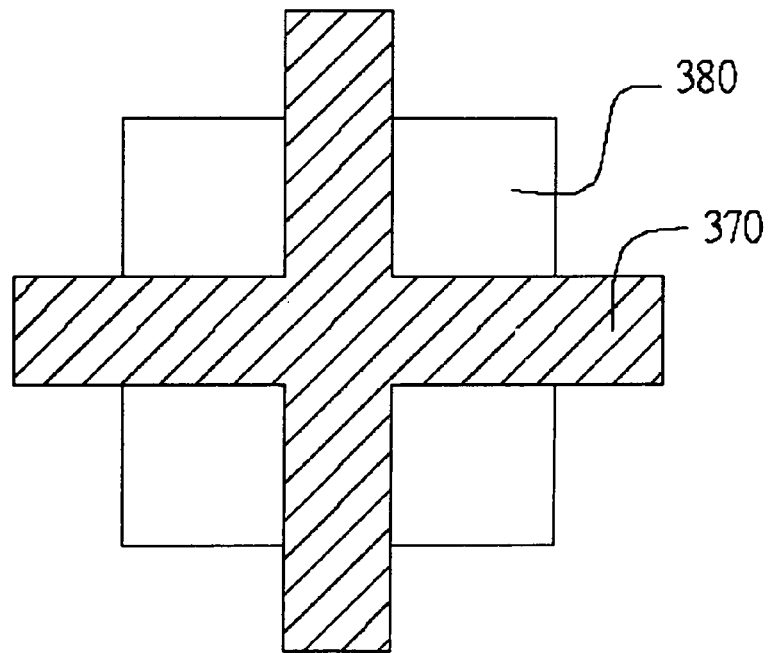
FIG. 14 is a plane schematic view of a lower surface of a spacer according to a still further embodiment of the present disclosure.

Referring to FIG. 10, it depicts a plane schematic view of the pad layer 370 and the lower surface of the spacers 380 according to an embodiment of the present disclosure. The pad layer 370 is disposed on the lower surface 388 of the spacers 380 and can be various shapes, such as the shape of rectangle shown in FIG. 10. Referring to FIG. 11, it depicts a plane schematic view of the pad layer 370 and the lower surface of the spacers 380 according to another embodiment of the present disclosure. The pad layer 370 is disposed on the lower surface 388 of the spacers 380 and can be various shapes, such as the shape of rectangle shown in FIG. 11. Referring to FIG. 12, it depicts a plane schematic view of the pad layer 370 and the lower surface of the spacers 380 according to a further embodiment of the present disclosure. The pad layer 370 is disposed in four corners of the lower surface 388 of the spacer 380. Referring to FIG. 13, it depicts a plane schematic view of the pad layer 370 and the lower surface of the spacers 380, according to another embodiment of the present disclosure. The pad layer 370 surrounds the lower surface 388 of the spacer 380. Referring next to FIG. 14, FIG. 14 depicts a plane schematic view of the pad layer 370 and the lower surface of the spacers 380 according to a further embodiment of the present disclosure. The pad layer 370 can be in the shape of cross and is disposed on the lower surface 388 of the spacer 380.

It is apparent to one of ordinary skill in the art that there are various arrangements of the spacers and the pad layer. The pad layer is used for forming the lump. When the liquid crystal display device is pressed by an external pressure or a load, the lump 394 of the spacers 380 with an elastic constant is firstly deformed because the lump 394 is protrudently disposed on the body 392, i.e. a first-stage deformation. Then, when the body 392 of the spacer 380 contacts the thin film transistor substrate 420, the whole spacer 380 with another elastic constant is completely deformed, i.e. a second-stage deformation. Thus, the spacer has a two-stage elastic constant, thereby enlarging the operation window of the quantity of the liquid crystal in the manufacturing process of the ODF technology. The spacer 380 with the two-stage elastic constant can be made of single material or different materials.

Figure 15:
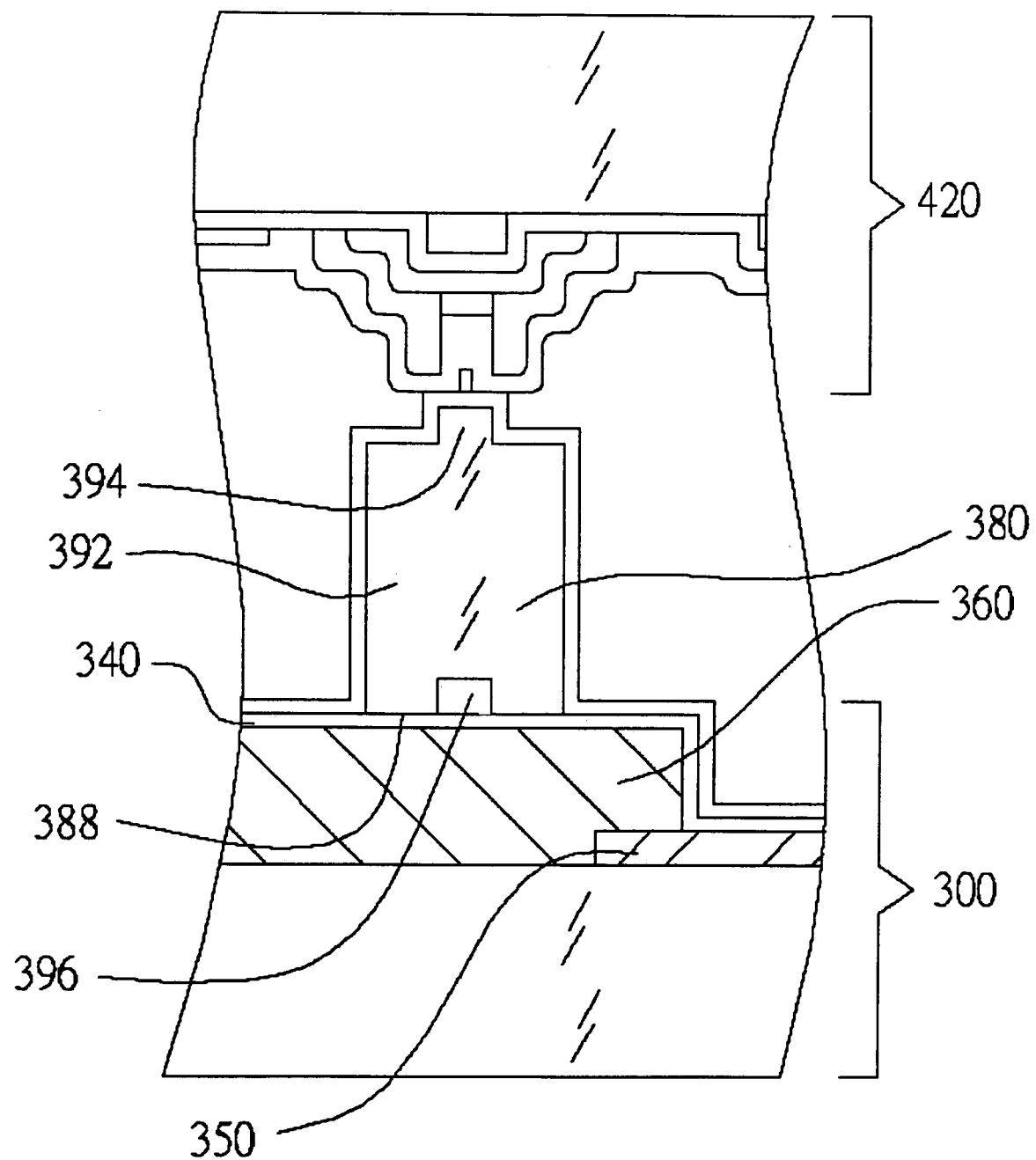
FIG. 15 is a cross-sectional schematic view of a spacer according to a still further embodiment of the present disclosure.

Referring to FIG. 15, it depicts the spacers 380 according to another embodiment of the present disclosure. Reference is made to Table I above (the table of reference numerals) for an identification of reference numbers not otherwise specifically called out in the description below. An understanding of the structure associated with such reference numbers will be appreciated by persons skilled in the art, from the remaining description provided herein. The spacer 380 includes a depression 396 disposed in a lower portion of the spacers 380 and a lump 394 disposed on an upper portion of the spacers 380. During the manufacturing process of the spacers 380, a pad layer (not shown) is firstly disposed under the spacers 380. After the spacers 380 and the lump 394 are formed, the pad layer will be etched, thereby forming the depression 396, which is located under the spacers 380.

Figure 16:
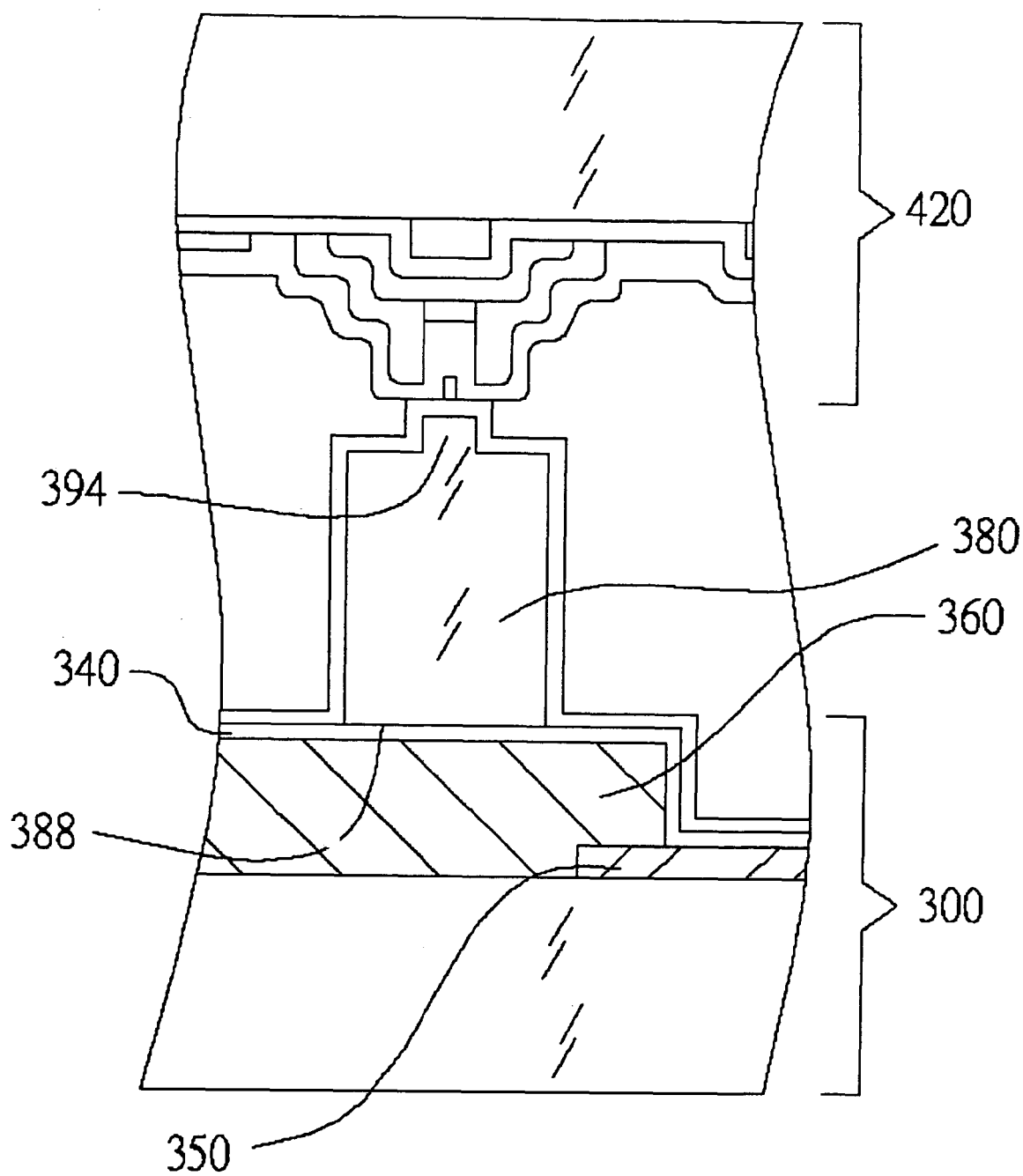
FIG. 16 is a cross-sectional schematic view of a spacer according to a still further embodiment of the present disclosure.

Referring to FIG. 16, it depicts the spacers 380 according to another embodiment of the present disclosure. Reference is made to Table I above (the table of reference numerals) for an identification of reference numbers not otherwise specifically called out in the description below. An understanding of the structure associated with such reference numbers will be appreciated by persons skilled in the art, from the remaining description provided herein. The spacers 380 include a lump 394 disposed on an upper portion of the spacers 380, where a lower portion of the spacers 380 is flat. A photo-resist can become the spacers 380 by using the photolithography process of a photo mask (not shown). The photo mask has a completely transmissive portion for forming the lump 394 and a partial transmissive portion, such as an optical grating or a partial transmissive film, for forming a main body of the spacer 380.

Figure 17:
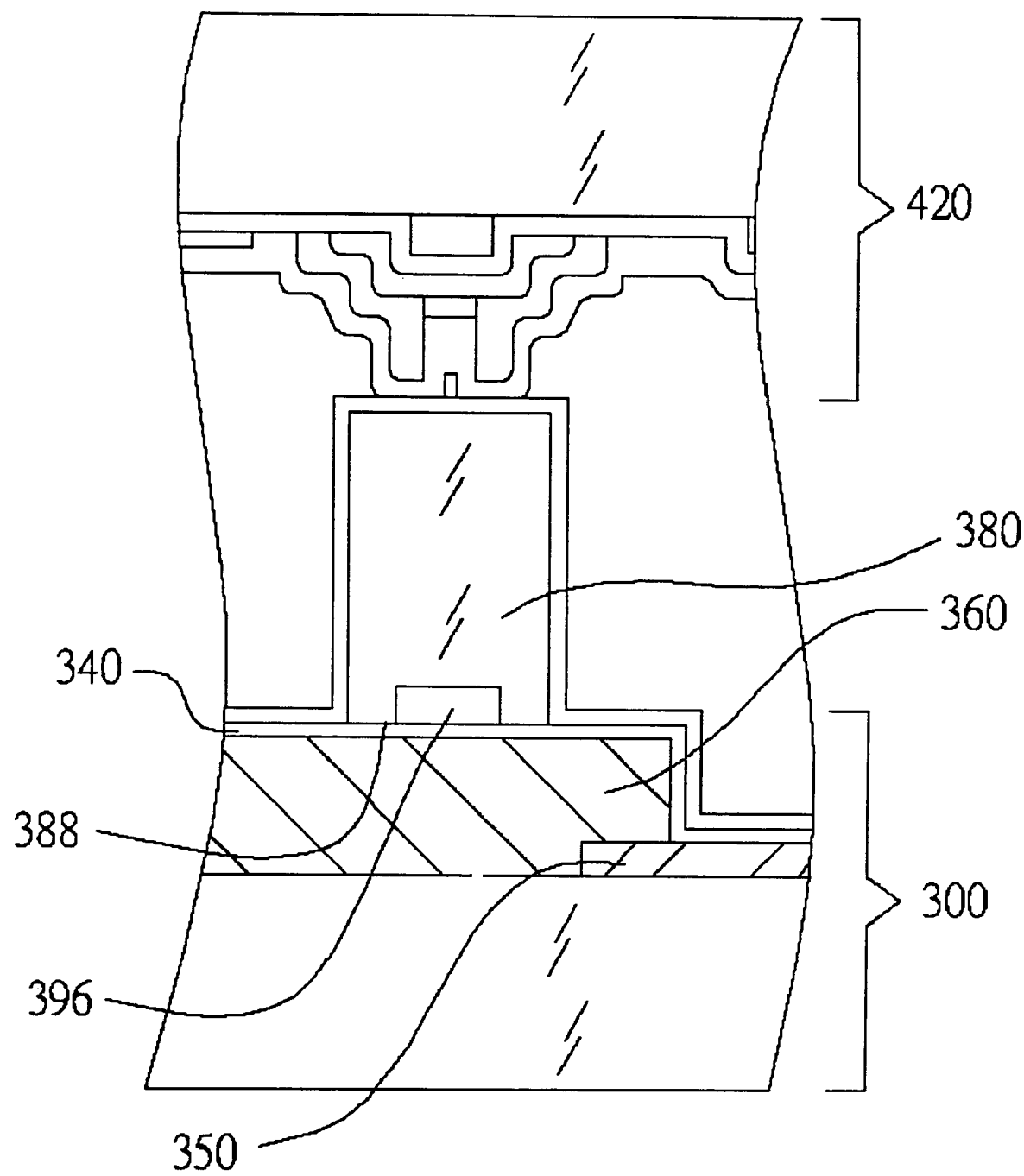
FIG. 17 is a cross-sectional schematic view of a spacer according to a, still further embodiment of the present disclosure.

Referring to FIG. 17, it depicts the spacers 380 according to a further embodiment of the present disclosure. Reference is made to Table I above (the table of reference numerals) for an identification of reference numbers not otherwise specifically called out in the description below. An understanding of the structure associated with such reference numbers will be appreciated by persons skilled in the art, from the remaining description provided herein. As described above, a photo-resist becomes spacers 380 by using a photolithography process, where there is a flat surface to be formed because the photo-resist is coated. In other words, the upper portion of the spacers 380 is flat. After the spacer 380 is formed, the color filter substrate 300 is processed by an etching process to remove a pad layer (not shown), such that a depression 396 is formed in the lower portion of the spacers 380. When the spacer 380 is pressed, the body 392, which is located above the depression 396, is downward deformed to form a first-stage deformation. Then, when the body 392, which is located above the depression 396, contacts the common electrode 340, it is not slightly easy for the spacers 380 to deform, i.e. to form a second-stage deformation.

It is apparent to one of ordinary skill in the art that the spacer also can firstly form on the thin film transistor substrate and then contact the color filter substrate, according to the arrangement requirement of the liquid crystal display device. In other words, the lower surface of the spacer is disposed on the thin film transistor substrate, and the upper surface of the spacer contacts the color filter substrate. Therefore, embodiments can be applied to different types of liquid crystal display devices.

Figure 18:
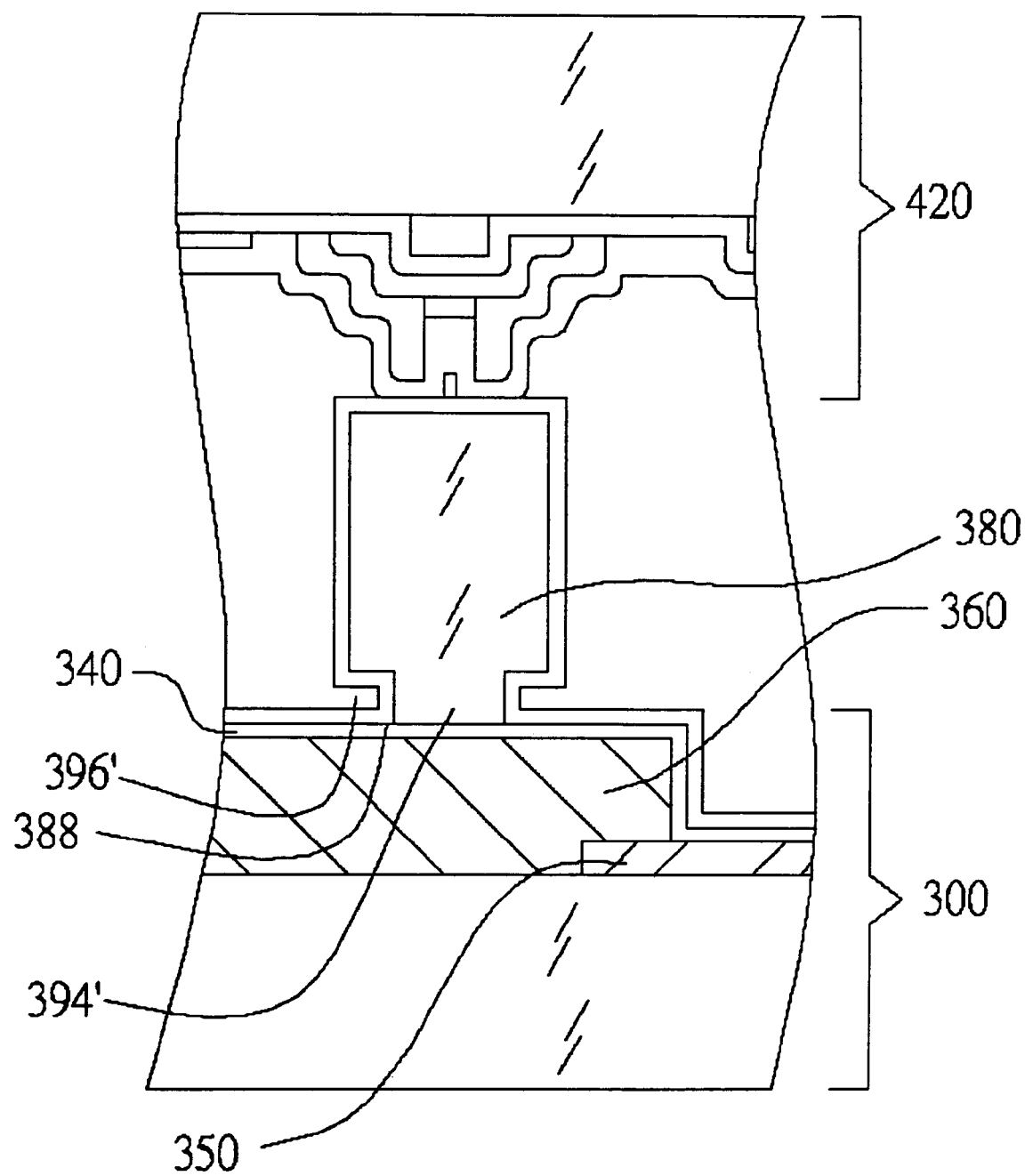
FIG. 18 is a cross-sectional schematic view of a spacer according to a still further embodiment of the present disclosure.

Referring to FIG. 18, it depicts the spacers 380 according to a still further embodiment of the present disclosure. Reference is made to Table I above (the table of reference numerals) for an identification of reference numbers not otherwise specifically called out in the description below. An understanding of the structure associated with such reference numbers will be appreciated by persons skilled in the art, from the remaining description provided herein. The spacer 380 shown in FIG. 18 is similar to that shown in FIG. 17, wherein the upper portion of the spacers 380 is flat. Also, the spacer 380 has a lump 394' and a gap 396' disposed on the lower portion of the spacers 380. The gap 396' surrounds the lump 394'. During the manufacturing process, a pad layer (not shown) is disposed around the common electrode 340, and then a photo-resist is flatly coated on the common electrode 340 and the pad layer. The photo-resist becomes the spacer 180 by using photolithography and etching processes. Finally, the pad layer is removed by using an etching process so as to form the gap 396', i.e. to form the lump 394'.

It is apparent to one of ordinary skill in the art that the spacer is firstly formed on the thin film transistor substrate and then the spacer contacts the color filter substrate according the requirement of spacer arrangement of the liquid crystal display device. In other words, the lower surface of the spacer is disposed on the thin film transistor substrate and the upper surface of the spacer contacts the color filter substrate. This is applicable to many different types of liquid crystal display devices.

Although the present disclosure has been explained in relation to its preferred embodiment, it is not used to limit the present disclosure. It is to be understood that many other possible modifications and variations can be made by those skilled in the art without departing from the spirit and scope of the present disclosure as hereinafter claimed.

What is claimed is:

1. A liquid crystal display device, comprising:
a first substrate, comprising:
a plurality of color filters; and
a common electrode covering the color filters;
a second substrate joined with the first substrate for forming a cavity;
a liquid crystal material disposed in the cavity, wherein the liquid crystal material is filled via a One Drop Fill (ODF) process;
a plurality of spacers, each having an upper surface and a lower surface and disposed on one of the color filters, wherein a portion of the common electrode is interposed between each of the spacers and the corresponding color filter and the lower surface of each of the spacers is directly coupled to the common electrode; and
an alignment film formed on the second substrate and contacting the spacers,
the second substrate has one or more protrudent patterns, each protrudent pattern including a thin film transistor (TFT), each protrudent pattern is coupled to a respective upper surface of one of the spacers, each protrudent pattern has a lower surface that defines a coupled surface,
the respective upper surface of the spacer has a single horizontal plane, and the area of the respective upper surface is substantially larger than the area of the coupled surface, a portion of the alignment layer is interposed between the coupled surface of each protrudent pattern and the upper surface of the corresponding spacer;
wherein the plurality of spacers is deformable by the application of a load, and
wherein each of the plurality of spacers is a single structure made of a single material, when the liquid crystal display device is pressed by the load, a portion of the spacer located under the coupled surface is firstly deformed, and when the whole upper surface of the spacer contacts the second substrate, the whole spacer is completely deformed.

2. The liquid crystal display device as claimed in claim 1, wherein the spacer is of cylindrical shape.

3. The liquid crystal display device as claimed in claim 1, wherein the spacer is of rectangular shape.

4. The liquid crystal display device as claimed in claim 1, wherein the first substrate is a color filter substrate.

5. The liquid crystal display device as claimed in claim 1, wherein the second substrate is a thin film transistor substrate.

6. The liquid crystal display device as claimed in claim 1, wherein the protrudent pattern is a thin film transistor of a thin film transistor substrate.

7. The liquid crystal display device as claimed in claim 1, wherein each coupled surface is parallel to the respective upper surface.

* * * * *